US010244282B2

(12) United States Patent
Agro et al.

(10) Patent No.: US 10,244,282 B2
(45) Date of Patent: Mar. 26, 2019

(54) METHODS FOR SYNCHRONIZING AND GENERATING A STREAM, AND CORRESPONDING COMPUTER PROGRAMS, STORAGE MEDIA, AND PLAYBACK, EXECUTION AND GENERATION DEVICES

(71) Applicant: Orange, Paris (FR)

(72) Inventors: Roberto Agro, Bourg la Reine (FR); Halim Bendiabdallah, Vaucresson (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 15/025,124

(22) PCT Filed: Sep. 26, 2014

(86) PCT No.: PCT/FR2014/052427
§ 371 (c)(1),
(2) Date: Mar. 25, 2016

(87) PCT Pub. No.: WO2015/044607
PCT Pub. Date: Apr. 2, 2015

(65) Prior Publication Data
US 2016/0249094 A1     Aug. 25, 2016

(30) Foreign Application Priority Data

Sep. 26, 2013   (FR) ..................................... 13 59311

(51) Int. Cl.
*H04N 21/436*      (2011.01)
*H04N 21/434*      (2011.01)
(Continued)

(52) U.S. Cl.
CPC .  *H04N 21/43615* (2013.01); *H04N 21/23424* (2013.01); *H04N 21/4126* (2013.01);
(Continued)

(58) Field of Classification Search
CPC combination set(s) only.
See application file for complete search history.

(56) References Cited

U.S. PATENT DOCUMENTS 8,090,241 B2 *  1/2012  Rajakarunanayake ...................... H04N 21/4325
386/200
8,855,059 B2 * 10/2014  Garudadri ............... H04L 29/06
370/329
(Continued)

FOREIGN PATENT DOCUMENTS

EP       2343881 A2    7/2011
EP       2750309 A1    7/2014
(Continued)

OTHER PUBLICATIONS

English Translation of the International Search Report and Written Opinion dated Feb. 4, 2015 for International Application No. PCT/FR2014/052427, filed Sep. 26, 2014.
(Continued)

Primary Examiner — Tri H Phan
(74) Attorney, Agent, or Firm — David D. Brush; Westman, Champlin & Koehler, P.A.

(57) ABSTRACT

A method and apparatus are provided for synchronizing between rendering of a multimedia stream by a rendering device and execution of an operation by a software application by at least one execution device. The method includes in the rendering device: receiving the multimedia stream comprising pieces of additional data synchronized with a multimedia item; detecting, in the multimedia stream, an item of destination information indicating that the pieces of additional data are intended for a distinct execution device; extracting the pieces of additional data; transmitting the pieces of additional data to the execution device; triggering the execution, by a software application, of an operation to
(Continued)

process the transmitted additional data; and rendering the multimedia item.

14 Claims, 3 Drawing Sheets

(51) Int. Cl.
  *H04N 21/81* (2011.01)
  *H04N 21/462* (2011.01)
  *H04N 21/234* (2011.01)
  *H04N 21/41* (2011.01)
  *H04N 21/43* (2011.01)
  *H04N 21/435* (2011.01)
  *H04N 21/8545* (2011.01)

(52) U.S. Cl.
  CPC ....... *H04N 21/435* (2013.01); *H04N 21/4307* (2013.01); *H04N 21/4345* (2013.01); *H04N 21/4348* (2013.01); *H04N 21/4349* (2013.01); *H04N 21/4622* (2013.01); *H04N 21/8173* (2013.01); *H04N 21/8186* (2013.01); *H04N 21/8545* (2013.01)

(56) References Cited

U.S. PATENT DOCUMENTS

| | | | | |
|---|---|---|---|---|
| 9,060,151 | B2* | 6/2015 | Kim | H04N 21/2362 |
| 9,288,554 | B2* | 3/2016 | Lee | H04N 7/08 |
| 9,445,157 | B2* | 9/2016 | Barrett | H04N 5/44543 |
| 9,589,296 | B1* | 3/2017 | Li | G06Q 30/0641 |
| 9,661,371 | B2* | 5/2017 | Moon | H04N 21/23617 |
| 9,860,611 | B2* | 1/2018 | Kim | H04N 21/8458 |
| 2013/0074117 | A1* | 3/2013 | Song | H04W 4/06 725/31 |
| 2014/0211096 | A1 | 7/2014 | Itoh | |
| 2014/0214967 | A1 | 7/2014 | Baba et al. | |

FOREIGN PATENT DOCUMENTS

| | | |
|---|---|---|
| JP | 2013176105 A | 9/2013 |
| WO | 2013031556 A1 | 3/2013 |

OTHER PUBLICATIONS

French Search Report and Written Opinion dated Apr. 2, 2014 for French Application No. 1359311 filed Sep. 26, 2013.
Heloisa Simon et al., "Enrichment of Interative Digital TV using Second Screen", International Journal of Computer Applications, vol. 64, No. 22, Feb. 15, 2013, pp. 58-64, XP0551100571.
Rani Malhotra, "Hybrid Broadcast Broadband TV: The Way Forward for Connected TVs", IEEE Consumer Electronics Magazine, IEEE, Piscataway, NJ, USA, vol. 2, No. 3, Jul. 1, 2013, pp. 10-16, XP011519366.
DVB Organization, "TM-CSS 0092r02 Companion Screens and Supplementary Streams Report—Under Liaison Agreement.docx", DVB, Digital Video Broadcasting, C/O EBU—17A Ancienne Route—CH-1218 Grand Saconnex, Geneva—Switzerland, Jul. 20, 2013, XP017840983.
Ziegler Christoph, "Second screen for HbbTV—Automatic application launch and app-toapp communication enabling novel TV programme related second-screen scena", 2013 IEEE Third International Conference on Consumer Electronics Berlin (ICCE—Berlin), IEEE, Sep. 9, 2013, pp. 1-5, XP032549104.
English translation of the Office Action dated Aug. 15, 2018 from the Japanese Patent Office for corresponding JP Application No. 2016-516843.
European Telecommunications Standards Institute (Nov. 2012). TS 102 796—V1.2.1, Hybrid Broadcast Broadband TV—ETSI, France, pp. 1-88, retrieved Aug. 8, 2018 from https://www.etsi.org/deliver/etsi_ts/102700_102799/102796/01.02.01_60/ts_102796v010201p.pdf.

* cited by examiner

METHODS FOR SYNCHRONIZING AND GENERATING A STREAM, AND CORRESPONDING COMPUTER PROGRAMS, STORAGE MEDIA, AND PLAYBACK, EXECUTION AND GENERATION DEVICES

CROSS-REFERENCE TO RELATED APPLICATIONS

This Application is a Section 371 National Stage Application of International Application No. PCT/FR2014/052427, filed Sep. 26, 2014, which is incorporated by reference in its entirety and published as WO 2015/044607 A1 on Apr. 2, 2015, not in English.

1. FIELD OF THE INVENTION

The field of the invention is that of digital television (DTV).

In a digital television system, a multimedia transport stream is distributed by cable, satellite, terrestrial wireless or ADSL (Asymmetric Digital Subscriber Line). This multimedia transport stream contains one or more programs (also called services), each of which is constituted by images, sounds and other complementary information (data). It is broadcast to users (final customers) who possess a specific decoder (also called a set-top box) or a connected television set, or more generally a playback or rendering terminal provided with functions of demultiplexing and decoding such a stream.

The present invention can be applied especially but not exclusively in the case of a multimedia transport stream compliant with the MPEG-2 TS (Moving Picture Experts Group-2 Transport Stream) and DVB (Digital Video Broadcasting) standards described in the ISO/CEI 13818-1 standard.

More particularly, the invention can be applied to interactive television, defined for example in the HBBTV (Hybrid Broadcast Broadband TV) standard which, in the case of connected television sets and decoders (or set-top boxes), provides for the adding of information to be displayed on the screen of the television set while the user is watching a television program (television channel).

2. TECHNOLOGICAL BACKGROUND

In television, there is an increasing number of shows that bring about viewer participation (or audience participation). For example, in television reality show, the viewer can vote for a candidate or, in a games show he can respond to a quiz. In every case, the television viewer has to give an answer to a question that he is asked during the show. The television viewer is asked the question through least one image that is displayed by the television screen. As a complement or alternatively, the question can be formulated vocally by the presenter of the show and is rendered by the television speakers.

2.1 HBBTV

According to the HBBTV standard, the pieces of additional information to be displayed on the television screen are available directly in the multimedia stream (broadcast information) or else delivered via a connection (return channel) between the user's terminal (the connected television set or set-top box) and a server of the broadcaster or a third party operating in relation with the broadcaster (information transmitted through broadband unicast access). This should ultimately make it possible to cover every use generally offered by connected television: catch-up TV, VOD (video-on-demand), interactive advertising, customizing programs, voting, games, social networks, program guides, etc.

For example, during a cookery show, the viewer can have the recipe displayed on his HBBTV terminal if the information is being streamed by the broadcaster.

An HBBTV terminal (i.e. a terminal compatible with the HBBTV standard) has a software architecture generally comprising a systems software program above which an interactive television middleware program is executed. Within the interactive television middleware program, we can generally distinguish a module for managing interactive applications (including a browser), a module for managing tables and a module for managing object carousels.

During the deployment of a given interactive application associated with a given program (on a television channel), the broadcaster transmits the given program within a multimedia stream, this program comprising:
  elementary audio and/or video streams;
  tables describing these elementary streams, in particular the PAT ("Program Allocation Table") and the PMT ("Program Map Table");
  constituent elements (especially a software code, for example in HTML, in the form of a web page) of a given interactive application transmitted for example within an object carousel encoded according to the DSM CC ("Digital Storage Media Command and Control") standard;
  an AIT (Application Information Table) identifying all the interactive applications available for the given program (including a given interactive application) as well as the way in which these interactive applications are available (object carousel in this case for the given interactive application).

Upon reception of this given program, the HBBTV terminal displays the audio and video streams (through tables that describe them). Besides, within the interactive television middleware program, the table management module processes the AIT table and detects the fact that a software code of the given interactive application has been transmitted in an object carousel. The carousel management module receives and reassembles the constitute elements of the given interactive application and the applications management module manages the given interactive application (reassembled by the carousel management module). Like any interactive application, this application can for example take one of the following states: loaded, paused, active or destroyed.

In one variant of the deployment of a given interactive application, the given (broadcast) program does not include the constituents of the given interactive application but the AIT table specifies a URL address at which the given interactive application can be obtained. Within the interactive television middleware of the HBBTV terminal, we then have the following actions: the table management module processes the AIT table and obtains this URL address; the browser of the applications management module sends a request to this URL address in order to receive the given interactive application; and the applications management module manages the given interactive application.

One drawback of this operation, whatever the deployment mode used, lies in the fact that there is visual discomfort for the user. Indeed whenever, on a given television channel (a program), the user accesses a particular interactive application associated with a program proposing access to a web portal, this leads to the display, as an overlay on the current TV program, of a window containing a message or a logo informing the user that access to a portal is possible by pressing a button (the OK button for example) on the remote control of the HBBTV terminal. Besides, when the user validates access to a portal, he is no longer able to follow the current TV program since he is redirected towards the screens of the portal on his HBBTV terminal.

2.1 "Second-Screen" Applications

There are numerous initiatives by broadcasters and television content producers for the development of services on smartphones or tablets used to provide additional content complementing television programs. These proprietary developments are known as "second-screen applications" and provide contents complementary to the television programs according to the scope (for example for all channels, for one channel or for one program) on a device (for example a smartphone or a tablet) that is distinct from the one used to view the TV program (for example a television set). These additional contents can be editorials or interactive contents (such as quizzes, surveys, predictions, etc.) which may or may not be synchronized with the TV program.

In most cases, synchronization is necessary between the TV stream and the contents displayed on the second-screen application of the second device and can be implemented by several different technologies, among them:

watermarking: this technique consists of the addition of supplementary pieces of information to an audio-visual content enabling the insertion of "markers" into the content. This technique is often used to insert a copyright. It is also used to insert audio markers into the TV stream that are imperceptible to the user but can be captured by the second-screen application to trigger a process or action. Digital watermarking is implemented at the broadcaster level;

digital fingerprinting: this technique consists in generating a file of signatures from an audio-visual content. This file then enables an audio synchronization module listening to a stream (for example on the second device executing the second-screen application), to know the precise position in the content. For example, an audio signature of an episode in a series makes it possible to know the position in the episode in which the viewer is situated. This technique is independent of the broadcaster and is not very reliable because it depends on ambient noise and the quality of reception in the room where the viewer is watching TV;

a technique known as time-stamping: this technique consists in triggering events on the second-screen application only on a time-related basis. This technique is not very reliable and does not enable management of the lags or divergences that could occur between different means for receiving TV streams (IPTV, TNT, satellite, etc.).

The main drawback of these second-screen applications therefore lies in the lack of reliability or of precision of the synchronization techniques needed for their efficient operation.

A second drawback of these second-screen applications lies in the fact that they are specific to each broadcaster or even to each program and therefore do not allow for any pooling of the technical functions developed for each of them.

3. SUMMARY OF THE INVENTION

One particular embodiment proposes a method of synchronization between a rendering of a multimedia stream by a rendering device and an execution of an operation by a software application by at least one execution device, the rendering and execution devices being present within a local area communications network.

The method comprises the following steps in the rendering device:

receiving the multimedia stream, the multimedia stream comprising pieces of additional data synchronized with a multimedia element contained in the multimedia stream, detecting, in the multimedia stream, at least one piece of destination information indicating that the pieces of additional data are intended for at least one execution device distinct from the rendering device, extracting the multimedia element and the pieces of additional data from the multimedia stream, transmitting the pieces of additional data to the execution device, the transmitting triggering an execution, by the software application of the execution device, of an operation for processing the pieces of additional data transmitted, rendering the multimedia element.

Thus, the invention proposes a method for synchronizing the execution of an operation for processing pieces of additional data with the rendering of a multimedia element contained in the multimedia stream, in providing for a retransmission of additional data, contained in the multimedia stream and received by a device for rendering the multimedia stream, towards a distinct device in charge of the execution of this processing operation relative to these pieces of additional data, via a software application that is for example preliminarily downloaded and installed on said distinct execution device.

The general principle of the invention relies especially on the presence, in the multimedia stream, of an indicator used to detect the fact that the pieces of additional data are intended for processing by a device other than the one that has received the multimedia stream. Once this indicator has been detected, the device for rendering the multimedia stream processes this indicator to extract pieces of additional data therefrom and then to transmit these pieces of additional data, for example via a communications module, to the recipient execution device.

Thus, these pieces of additional data are processed by a device distinct from the device for rendering the stream, enabling improved ergonomy for the user who can continue to view the multimedia streams on the rendering device (for example a television program on a television set) while at the same time having the benefit of pieces of additional information produced by the execution, by this distinct device (for example a smartphone or a tablet), of the operation for processing pieces of additional data (this operation corresponding for example to a connection and display of a given web page or an execution of an interactive application pertaining to the content of the multimedia element).

In addition, the invention enables a fine and precise synchronization between the rendering of a multimedia element of the multimedia stream and the operation for processing pieces of additional data. For example, when this operation for processing comprises a rendering of pieces of additional information by the execution device, the invention enables a synchronization between the execution, by the execution device, of these pieces of additional information and the rendering, by the rendering device, of the multimedia element. Indeed, since the pieces of additional data inserted into the stream are synchronized with the multimedia element and received by a single rendering device, the execution device in charge of their processing receives them and processes them, hence also in a synchronized manner.

Finally, not only is the synchronization between the multimedia stream and the additional data optimized in terms of precision but since this synchronization is ensured by data transmitted in the multimedia stream, it is not necessary to provide for additional means of synchronization as in the prior-art techniques. The invention according to these different embodiments thus averts the use of cumbersome means of synchronization (such as techniques of audio synchronization, watermarking or fingerprinting) while at the same time providing for efficient synchronization.

For example, the multimedia stream is an HBBTV type stream and the additional data corresponds to an interactive application of a second-screen type.

Thus, according to this embodiment, the invention enables the execution of an interactive application of a second-screen type on a device distinct from the device for rendering the HBBTV stream, the interactive application being inserted into the HBBTV stream and synchronized with the HBBTV stream according to the HBBTV synchronization means.

According to this embodiment, the invention makes it possible to offer the user an interactive application service, of a second-screen type for example, that performs well in terms of precision of synchronization, the interactive application being transported or made accessible by means of additional pieces of data contained in the HBBTV stream received by the rendering device and then transmitted and exploited synchronously by the software application of the execution device.

In particular, the operations for rendering the multimedia element by means of the rendering device and for processing pieces of additional data by means of the execution device are synchronous since the pieces of additional data and the multimedia element are received synchronously in the multimedia stream, extracted from this stream and processed as soon as they are received by the rendering device on the one hand and by the execution device on the other hand. In particular, since the transmission of the pieces of additional data triggers the operation for processing these pieces of additional data, the rendering of the multimedia element by the rendering device and the processing of these pieces of additional data by the execution device can be done in parallel by these two devices.

In particular, the latency between, on the one hand, a display, on the execution device, of data resulting from the processing of additional data and, on the other hand, a display/rendering, on the rendering device, of the multimedia content depends, on the one hand, on the time taken by the rendering device to decode and/or render the multimedia content and, on the other hand, the time of transmission of the pieces of additional data to the execution device plus, in addition, the time taken by the execution device to process these pieces of additional data. In practice, this latency remains far less than one second. It is of the order of several tens or several hundreds of milliseconds. The pieces of additional data contained in the multimedia stream therefore form a "trigger" or command that triggers a processing on the execution device side. This processing is immediate, triggered as soon as these pieces of additional data are received by the execution device.

According to a particular characteristic of the invention, the information on destination (or destination information) is carried by a descriptor present in an AIT (Applications Information Table) signaling table of the HBBTV stream.

Thus, to offer the user an application service of a second-screen type that performs well in terms of precision of synchronization, the invention in this embodiment provides for the addition of a descriptor in the AIT table of the HBBTV stream making it possible to indicate whether the application identified by this AIT table is intended for a device distinct from the device for rendering the HBBTV stream.

In this way, upon detection of this descriptor, the rendering device knows that it must retransmit the pieces of additional data (corresponding to an interactive application) received in the stream and identified by the AIT table to another device which executes this interactive application.

According to one particular aspect of the invention, the method furthermore comprises the following steps:
  detecting, in the multimedia stream, at least one data packet associated with the pieces of additional data and intended for the execution device,
  extracting the data packet from the multimedia stream,
  transmitting the data packet associated with the pieces of additional data to the execution device, the transmission triggering an execution, by the software application of the execution device, of an operation for processing the data packet.

Thus, according to this embodiment, data packets associated with the pieces of additional data previously inserted into the multimedia stream and therefore also intended for the execution device can be detected, in the multimedia stream, by the rendering device so that they can be retransmitted towards the recipient execution device.

For example, these data packets can be inserted into the multimedia stream to update the additional data previously received while benefitting from the precise synchronization of the multimedia streams.

For example, the data packet associated with the additional data corresponds to an HBBTV "event stream" type event.

Thus, according to this embodiment, events of an "event stream" type can also be transmitted by the rendering device to the execution device, for example to provide notification of the events synchronized with the multimedia stream when the pieces of additional data are being processed on the execution device.

For example, when the pieces of additional data correspond to a second-screen type interactive application, the event streams enable the interactive application to be notified of the events during the execution of the interactive application. For example, the interactive application is a quiz application, and the "event stream" can be used to provide notification of the launching of a particular quiz once the quiz application has been launched.

The reception and/or the processing of the data packet associated with the additional data can be taken charge of by the software application that has received and processed the additional data, for example in order to transmit this data packet to the interactive application for processing. Or else this data packet can be taken charge of directly by the interactive application.

Here too, the latency between, on the one hand, a display on the execution device of data resulting from the processing of the data packet and, on the other hand, a display/rendering on the rendering device of the multimedia content received with this data packet depends, on the one hand, on the time of decoding and/or processing of the multimedia content by the rendering device and, on the other hand, on the time of transmission of the data packet to the execution device plus, in addition, the time of processing of this data packet by the execution device. In practice, this latency remains far less than one second. It is of the order of a few tens or even hundreds of milliseconds.

The data packet contained in the multimedia stream therefore forms a trigger or command that triggers a processing on the execution device side. This processing is immediate, triggered upon reception of this data packet by the execution device.

Whatever the option of embodiment chosen, the method comprises the following steps:
  detecting, in said multimedia stream, at least one data packet associated with said pieces of additional data and intended for said at least one execution device,
  extracting said data packet from said multimedia stream,
  transmitting said data packet to said at least one execution device, said transmission triggering an execution by said interactive application of an operation of processing of said data packet.

According to one particular characteristic of the invention, the steps of extracting correspond to a demultiplexing of the pieces of additional data and/or of the data packet associated with the pieces of additional data.

Thus, according to this embodiment, the processing of the multimedia stream received by the rendering device consists in demultiplexing the pieces of additional data inserted into the stream so that they can be transmitted, without being interpreted or executed, to a distinct execution device which is itself in charge of interpreting and executing them.

For example, if the pieces of additional data correspond to a URL inserted into the stream, the demultiplexing consists in extracting this URL so as to be able to transmit it to the execution device.

In the case of data packets associated with the pieces of additional data, such as an HBBTV "event stream", the demultiplexing consists in extracting the event stream so as to transmit it to the execution device.

According to one particular aspect, the method also comprises a step for detecting, in the multimedia stream, at least one indicator indicating the end of execution, by the software application of the execution device, of the operation for processing additional data previously transmitted to the execution device.

Thus, according to this embodiment, the invention also enables the execution of the additional data by the execution device to be stopped through an indicator detected in the multimedia stream and transmitted by the rendering device to the execution device.

For example, in the HBBTV standard, specific tables are provided to this end.

According to one particular characteristic, the method furthermore comprises a preliminary step for announcing the presence of the rendering device within the local area communications network.

Thus, according to this embodiment of the invention, the rendering device is reported as being present in the local area communications network to which it is connected so that the execution device or devices also present in this same local area communications network can know of its presence, for example via a process of discovery such as SSDP (Simple Service Discovery Protocol) used for the discovery of UPnP (Universal Plug and Play) entities.

According to another aspect of the invention, the method furthermore comprises the following steps in the execution device:
  discovery of the rendering device announced during the step for announcing presence,
  reception of additional data coming from the rendering device,
  execution, by the software application of the execution device, of an operation for processing additional data received.

This embodiment of the invention more particularly relates to the execution device and the steps implemented in this device.

In particular, the execution device begins by getting to know the rendering device or devices connected to the same local area network as itself so that it can, if necessary, implement a mechanism of data communications with this rendering device or these rendering devices.

In particular, when a rendering device has implemented a step of announcing its presence in the local area network, the execution device can consequently discover it.

Once this process of discovery has been performed, the execution device receives pieces of additional data, preliminarily received and retransmitted, according to the different embodiments of the invention, by the rendering device.

As already described here above, these pieces of additional data are synchronized with the multimedia stream rendered on the rendering device and are therefore interpreted and executed by the appropriate module in the execution device. Thus, after having received them from the rendering device, the execution device interprets and executes these pieces of additional data via a software application, for example an application preliminarily downloaded and installed in the execution device.

For example, the execution device receives the pieces of the additional data coming from the rendering device through a communications module. This communications module then transmits them to the modules of the execution device for interpreting and executing the pieces of additional data. These modules then execute an operation for processing these pieces of additional data by means of a software application.

According to one particular aspect, the steps of transmission in the rendering device and of reception in the execution device, are implemented according to a mechanism belonging to the group comprising:
  a mechanism for requests sent out by the execution device to the rendering device to receive data,
  a mechanism for transmitting data to the execution device at the initiative of the rendering device.

Thus the invention, according to its different embodiments, provides for the use of several known mechanisms for transmitting the pieces of additional data, as well as associated data packets (such as events) from the multimedia stream rendering device to the device for executing the pieces of additional data. Among these known mechanisms, mechanisms at the initiative of the server or at the initiative of the customer can be implemented (for example "polling", "http Server Push", "UDP" transmission, etc.).

The invention also pertains to a method for generating a multimedia stream comprising the following steps:
  inserting pieces of additional data into the multimedia stream,
  inserting, into the multimedia stream, at least one piece of destination information indicating that the pieces of additional data are intended for at least one execution device distinct from a device for rendering the multimedia stream, and
  transmitting the multimedia stream to at least one device for rendering the multimedia stream designed for the transmission, following the detection of the destination information, of the pieces of additional data to a recipient execution device.

Thus, another aspect of the invention relates to the generation of a multimedia stream and, at a first stage, the insertion into this multimedia stream of pieces of additional data.

In a second stage, the method for generating the multimedia stream inserts, into the multimedia stream, an indicator enabling the device for rendering the stream to detect the fact that the pieces of additional data are intended for an execution device distinct from the device for rendering the stream.

The invention also pertains to a computer program comprising program code instructions to implement methods of synchronization and generation as described here above when the program is executed on a computer.

The invention also pertains to a computer-readable storage medium storing a computer program comprising a set of instructions that can be executed by a computer or a processor to implement the methods of synchronization and generation as described here above.

Another aspect of the invention pertains to a device for rendering a multimedia stream present within a local area communications network comprising the following means:
  a module for receiving the multimedia stream, the multimedia stream comprising pieces of additional data synchronized with a multimedia element contained in the multimedia stream,
  a module for detecting, in the multimedia stream, at least one piece of destination information indicating that the pieces of additional data are intended for at least one execution device distinct from the rendering device,
  a module for extracting the multimedia element and the pieces of additional data from the multimedia stream,
  a module for transmitting the pieces of additional data to the execution device, the transmission triggering an execution, by the software application of the execution device, of an operation for processing the pieces of additional data transmitted,
  a module for rendering the multimedia element.

Such a device is for example a television set, a decoder or again a computer comprising an application used to receive a multimedia stream and implement the steps of the method. Such a rendering device corresponds to any device capable of interpreting and rendering a multimedia stream, whatever its mode of broadcasting/transmission.

Another aspect of the invention pertains to a device for executing the pieces of additional data present within a local area communications network comprising the following means:
  a module for discovering at least one rendering device announced within the local area network,
  a module for receiving pieces of additional data coming from the rendering device,
  a module for the execution, by a software application of the execution device, of an operation for processing pieces of additional data received.

Such a device is for example a smartphone or a tablet.

Another aspect of the invention pertains to a device for generating a multimedia stream comprising the following means:
  means for inserting pieces of additional data into the multimedia stream,
  means for inserting at least one piece of destination information into the multimedia stream, indicating that the pieces of additional data are intended for at least one execution device distinct from a device for rendering the multimedia stream, the devices being present within a local area communications network, and
  means for transmitting the multimedia stream to at least one device for rendering the multimedia stream, designed for the transmission, following the detection of the destination information, of pieces of additional data to a recipient execution device.

4. LIST OF FIGURES

Other features and advantages of the invention shall appear from the following description, given by way of an indicative and non-exhaustive example, and from the appended drawings of which:

FIG. 1 presents the main steps of the method for transmitting pieces of additional data according to one particular embodiment of the invention;

5. DETAILED DESCRIPTION

In all the figures of the present document, the identical elements and steps are designated by a same numerical reference.

Here below in the description, it is assumed by way of a non-exhaustive example that the multimedia stream 100 is compliant with the MPEG-2 TS and HBBTV standards, and that it comprises pieces of additional data 110 corresponding to an interactive application, for example a "second-screen" type application to be executed on an execution device physically distinct from the rendering device. This interactive application may or may not be an HBBTV application (an HBBTV application being an application that is encoded in HTML (HTML-CE) and/or JavaScript and is conveyed in an HBBTV stream), and it may or may not be a web application. The invention can be applied however to different types of application and does not imply a particular encoding mode. It is enough for the software application of the execution device to be capable of triggering its execution, possibly by making use of the operating system of the execution device.

The pieces of additional data 110 are synchronized, i.e. inserted into the multimedia stream in a synchronized manner, with a multimedia element 120 of the multimedia stream 100 (for example the current part of the multimedia stream, such as a given program). Thus, the transmission of additional data to the execution device and the display of the multimedia element will be processed consecutively, without any lag between the processing of the additional data and the display of the element.

Figure 1:
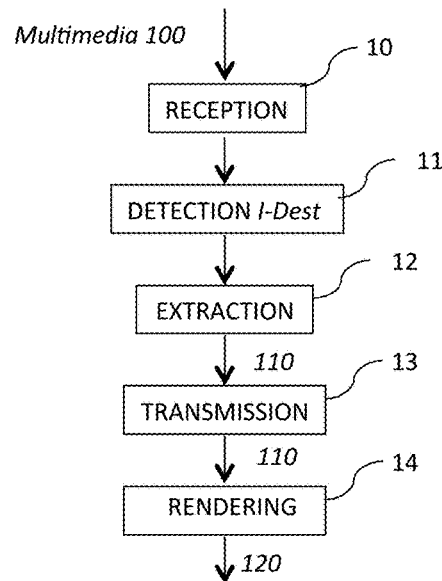
Figure 2:
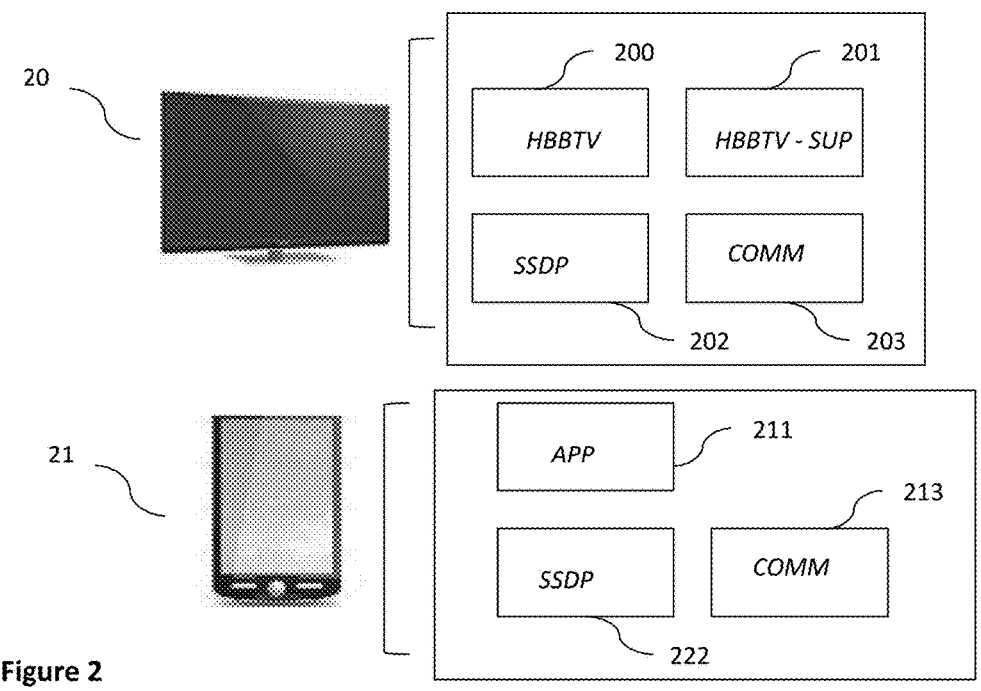
FIG. 2 is a block diagram of a system according to one particular embodiment of the invention.

Referring now to FIG. 1, we present the main steps of the method of synchronization according to one particular embodiment of the invention, in a system as illustrated in FIG. 2.

In this system, we consider a rendering device 20, for example an HBBTV television set, for rendering a multimedia stream 100 and an execution device 21, for example a software application, for executing an operation for processing additional data 110 (contained in the multimedia stream 100 and synchronized with a multimedia element 120 contained in the multimedia stream 100), for example a smartphone.

For example, the HBBTV multimedia stream corresponds to a televised gaming show and the pieces of additional data correspond to an interactive quiz application intended for execution on a second screen, distinct from the screen on which the televised gaming show is rendered. This application consists for example in enabling the viewer to answer quiz questions via his smartphone while continuing to view the televised gaming show ergonomically on his connected television set.

The first steps of the method of synchronization are implemented in the rendering device 20 which receives the multimedia stream 100 in a first reception step 10.

A step of detection 11 is then implemented in order to detect a piece of destination information, denoted as I-Dest, in the multimedia stream 10. This piece of destination information I-Dest indicates that the pieces of additional data 110 are intended for at least one execution device distinct from the rendering device 20, in this case the execution device 21.

In this example, this step of detection 11 is based on the fact that an interactive application is identifiable in an MPEG2 TS type multimedia stream by a DVB table. This is an AIT (Application Information Table). This table indeed contains different pieces of information enabling the execution of the interactive application and especially, in this embodiment of the invention, this table transports a private descriptor herein called a piece of destination information I-Dest. This piece of destination information I-Dest indicates the recipient terminal concerned by the interactive application. In the example considered, this is an execution device 21.

This step of detection 11 is implemented according to this embodiment by a supplementary HBBTV module 201 of the rendering device 20 denoted as HBBTV-SUP. Thus, the rendering device 20 comprises a standard HBBTV module 200 used to implement all the "standard" HBBTV functions and a supplementary HBBTV module 201 for implementing the invention according to its different particular embodiments.

In the following step 12 of extraction, the pieces of additional data 110 as well as the multimedia element 120 of the multimedia stream 100 are demultiplexed so that, during a transmission step 13, these pieces of additional data 110 can be transmitted to the execution device 21.

The multimedia element 120 for its part is rendered, on the rendering device 20, during a rendering step 14.

For example, this extraction step 12 is implemented by the standard HBBTV module 200 of the rendering device 20.

Besides, this extraction step 12 triggers an execution, by a software application 211 of the execution device 21, of an operation for processing these transmitted pieces of additional data 110 so that the rendering of the multimedia element 120 on the rendering device 20 and the execution of the operation for processing additional data 110 on the execution device 21 are synchronized.

The software application 211 of the execution device 21 is for example an application downloaded on the execution device 21 to make it possible to process the additional data received from the rendering device. This software application is for example a "native" application (this application can be downloaded on "Google Play" or "AppleStore" depending on the operating system).

This software application 211 is therefore implemented in the execution device 21 for the processing of additional data and must be clearly distinguished here below from the interactive application, for example of the HBBTV type and/or of a second-screen type, corresponding to the pieces of additional data 110 transmitted.

Thus, the execution by this software application 211 of this operation for processing additional data 110 actually consists in this example of the triggering of the execution of the interactive application.

As already indicated here above, there are two ways of triggering the execution of an interactive application from an execution device: either the HBBTV stream contains a piece of information on access to the interactive application (for example the AIT table contains a URL address from which the interactive application can be downloaded) or a part or the totality of the software module or modules constituting the interactive application is encapsulated in the HBBTV stream in a form that can be interpreted or executed by the execution device 21 (for example in a DVB carousel, for example in the form of metadata that can be interpreted by the software application 211 of the execution device 21).

In the case of the first variant, the operation for processing the additional data therefore consists in obtaining the URL, sending an HTTP request to this URL address in order to receive in return data constituting the interactive application in question, executing the interactive application and displaying a content resulting from this execution (quiz questions in the example considered). The data loaded can be either web pages, received and then displayed by the software application 211, or another (non-Web) application that can be interpreted and/or executed by the execution device 21 (by the software application 211 or by an operating system of the terminal 21).

In the case of the second variant, the operation for processing additional data therefore consists in interpreting the metadata constituting the interactive application that can be interpreted and/or executed by the execution device 21 (by the software application 211 or by the operating system of the terminal 21), executing the interactive application by means of the execution device 21 and displaying a content resulting from this execution (quiz questions in the example considered).

Besides, the transmission step 13 can be implemented by a communications module 203 of the rendering device 20, enabling a server type communication towards the execution device 21 and for example towards a communications module 213 of the execution device 21.

Thus, the communications module 213 of the execution device 21 receives the pieces of additional data 110 coming from the communications module 203 of the rendering device 20 and transmits them for example to the modules of the software application 211 (for example classic MMI and Business modules) in charge of interpreting them as described here above. In one embodiment, the communications module 213 is integrated into the software application 211 itself.

A description is now provided of the different modes of communication that can be implemented between the rendering and execution devices, according to different particular embodiments of the invention, by which the software application 211 of the execution device 21 can be informed that new pieces of additional data 110 are detected from the rendering device 20.

Several known communications technologies can be implemented, especially according to two known types of mechanisms.

For example, according to a first type of mechanism called "polling", the communications module 213 of the execution device 21 sends periodic requests to the communications module 203 of the rendering device 20 to find out if pieces of new data are available and, if so, it retrieves them.

According to a second type of communications mechanism known as the "push" mechanism, different techniques are used to transmit data from the rendering device 20 ("server") to the execution device 21 ("customer") at the initiative of the "server", for example according to the techniques known as "http Server Push" techniques.

According to a first technique, the HTTP server of the rendering device 20 does not close the connection after having sent its last response to the execution device 21. The connection therefore remains open and the server stacks the events until the customer interrogates it once again to retrieve a new event.

Two other techniques based on the "HTML5" standard enable the "push" "server-sent events" and "WebSocket" mechanisms. The "WebSocket" programming interface can be used especially to set up two-way communications (known as "full-duplex" communications) between a customer and a server.

According to a technique known as "long polling", the customer sends a request to the server and if the server does not have any new event for notification, the request will remain in a blocking position until a new notification arrives.

According to a UDP (User Datagram Protocol) transmission technique, the server can send out notification requests via the UDP protocol. The sending of the UDP packets can be done in unicast mode (intended exclusively for the customer who has previously given his IP address and the concerned port for the reception of UDP packets) or in multicast mode (as in the case of UPnP events). The multicast approach makes it possible for example to inform several execution devices of the local area network about the arrival of a new event.

Figure 3:
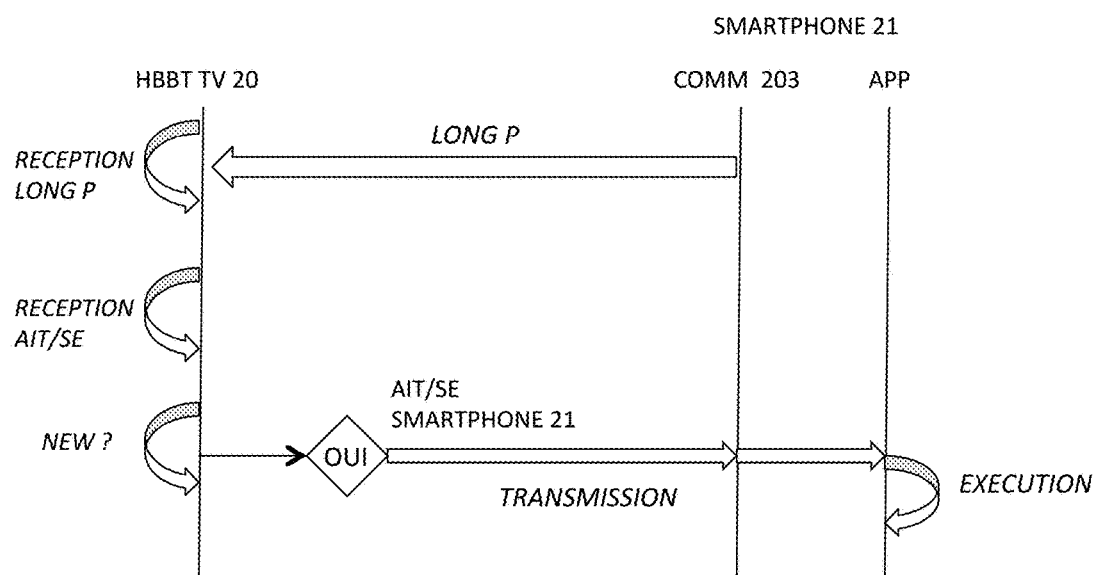
FIG. 3 is a sequence diagram generically showing an example of kinematics of communication between the two devices of the system of FIG. 2.

FIG. 3 illustrates an example of a "long polling" type communication denoted as LONG P, between a rendering device 20, for example an HBBTV TV, and an execution device 21, for example a smartphone. In this example, the customer, namely the smartphone, sends out a request LONG P to the server, i.e. the HBBTV TV. So long as the latter does not receive any new event (for example a stream event denoted as SE) or an AIT table, no response is made to the smartphone and when a new event is received by the HBBTV TV, the HBBTV TV responds to the smartphone, more specifically by transmitting pieces of data to the communications module 213 of the smartphone. This communications module 213 receives these pieces of data and transmits them to the module of the smartphone in charge of their execution, i.e. the software application 211.

Whatever the technique of communications chosen between the two devices, namely the rendering device 20 and the execution device 21, a step prior to any data exchange allows for the interlink of the different devices of the local area communications network involved in the implementing of the invention, according to the different particular embodiments of the invention.

This preliminary step can consist of a step of "discovery" or of announcing the presence of the rendering device 20 within the local area communications network.

Thus, according to first alternative embodiment, the rendering device 20 reports itself as being present in the local area communications network to which it is connected, so that the execution device 21 also present in this very same local area communications network can have knowledge of its presence, for example through a known process of discovery such as UPnP SSDP. For example, the announcements are sent by the rendering device 20 periodically.

According to a second variant, this step of discovery can also consist of the transmission of a search request by the execution device 21, searching for rendering devices. The rendering device or devices present in the local area communications network respond directly to the search request.

According to one particular embodiment different from the one illustrated in FIG. 2, several rendering devices can be present in the local area communications network. In this case, the execution device will have knowledge of the presence of these different rendering devices and will inform the user thereof by presenting him with a list of rendering devices from which he can select the rendering device to be used, with which the execution device must therefore communicate.

Once this step of discovery has been made, the rendering devices 20 and execution device 21 are therefore interlinked. The rendering device 20 can then transmit the additional data extracted from the multimedia stream to the execution device 21 when the appropriate destination information is detected in this multimedia stream as described here above.

When the different steps described here above have been implemented according to the different particular embodiments of the invention, the rendering of the multimedia element of the multimedia stream in the rendering device is synchronized with the execution of the operation, in the execution device, for processing the pieces of additional data synchronized with this multimedia element.

Indeed, according to a first alternative embodiment described here above, the synchronization between the processing of the additional data and the rendering of the multimedia stream is made possible by the use of the AIT table comprising the additional data synchronized with the multimedia stream carrying this AIT table. Indeed, since this AIT table is received and processed by a single rendering device 20, the execution device 21 in charge of their processing receives them and therefore also processes them synchronously.

According to another variant, the synchronization of the additional data in the HBBTV stream is made possible by the fact that an HBBTV stream is encapsulated in a carousel of objects encoded according to the DSM CC standard. This tool associated with the MPEG2 TS manages especially the transmission of synchronization events as well as of additional data in the MPEG2 transportation stream.

These events are classically called "stream events" and consist of small data packets that can be transmitted synchronously in the program signal. They therefore enable the transmission, at specific points in time, of additional data such as for example questions and answers to an interactive quiz.

In this case, and according to the different particular embodiments of the invention, these packets are immediately processed after they are demultiplexed within the rendering device 20 and immediately transmitted to the recipient execution device 21. It is therefore possible to finely and precisely synchronize additional data (such as for example an interactive application) with a multimedia stream of a TV channel.

It must be noted that several variants can be envisaged for the execution of an interactive application, in addition to the one described which consists in shifting this execution to a device distinct from the device for rendering the HBBTV stream.

Thus, it is also possible for the interactive application to be executed both on the rendering device of the HBBTV stream and also on the distinct execution device.

In this case, the AIT table comprises for example a descriptor indicating that the interactive application is intended for execution on the execution device and a descriptor indicating that the application can also be executed on the rendering device.

For example, if the interactive application is of little visual discomfort to the user, he may prefer not to use his smartphone and interact with the application directly on his connected television set.

In this case, the execution of the interactive application on the connected television set can be conditioned by a user action such as a validation on a specific button of the remote control.

We now present the main steps of the method for generating a multimedia stream according to one particular embodiment of the invention.

In a first stage, the method of generation inserts pieces of additional data into a multimedia stream. These pieces of additional data are to be processed synchronously with the rendering of the corresponding part of the stream.

For example, in the case of an HBBTV stream, these pieces of additional data correspond to an interactive application identifiable by an AIT table carried by the stream which contains information for loading and executing this interactive application.

In a second stage, the method for generating multimedia streams inserts an indicator into the multimedia stream. This indicator enables the device for rendering the stream to detect the fact that the pieces of additional data are intended for an execution device distinct from the device for rendering the stream.

For example, in the case of an HBBTV stream, this indicator corresponds to a descriptor of the AIT table indicating the device on which the interactive application is to be executed.

Finally, the method for generating transmits the multimedia stream to at least one rendering device designed for the transmission, following the detection of the destination information, of the pieces of additional data to a recipient execution device according to the different particular embodiments of the invention.

Figure 4A:
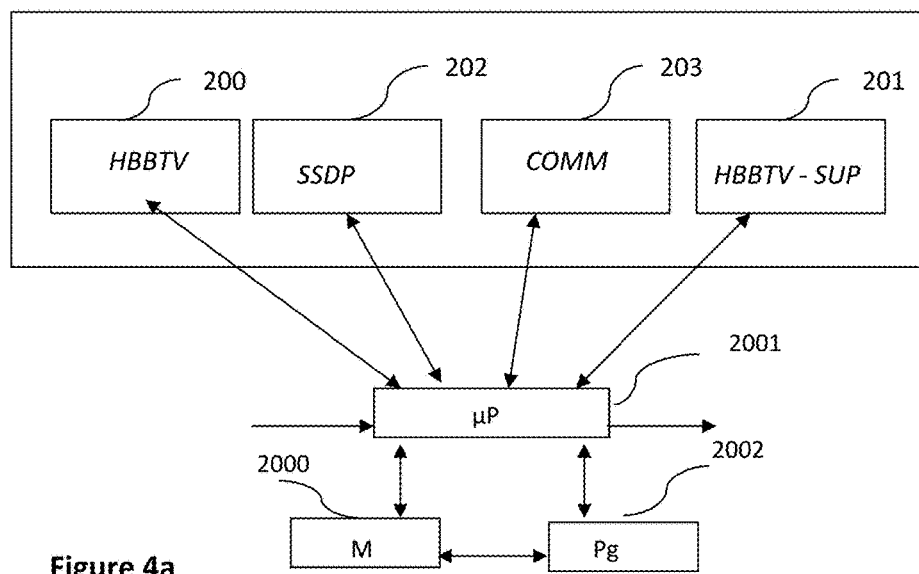
FIGS. 4a to 4c illustrate examples of a simplified structure of a rendering device, an execution device and a generating device according to one embodiment of the invention.
Figure 4B:
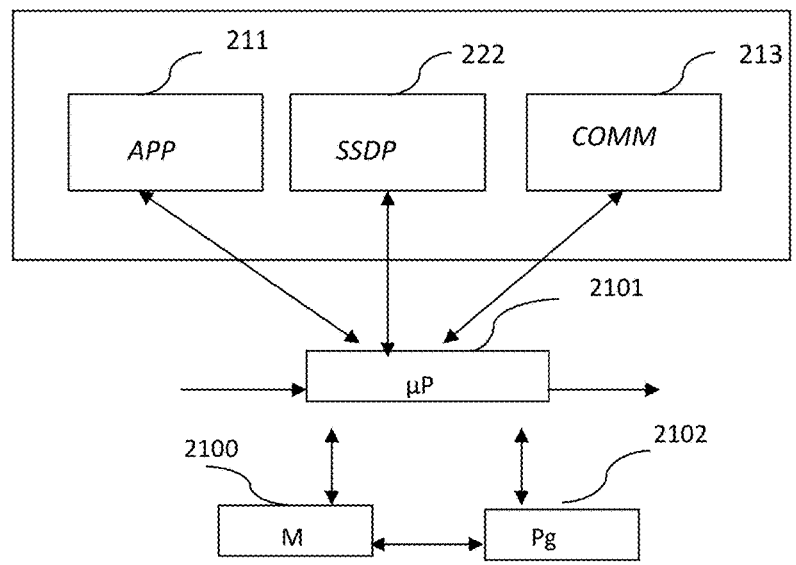
Figure 4C:
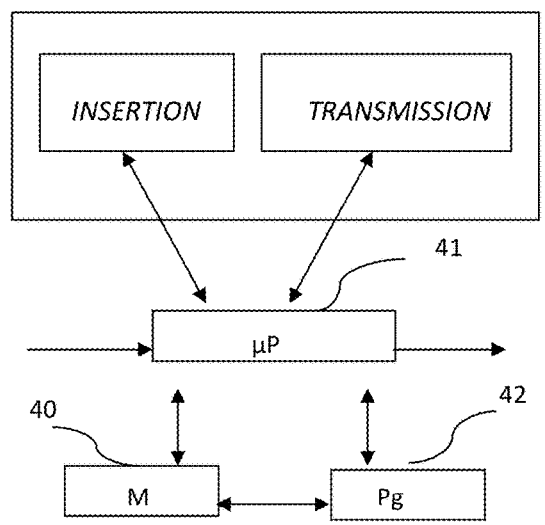

Finally, referring to FIGS. 4a to 4c respectively, we present the simplified structure of a rendering device, the simplified structure of an execution device and the simplified structure of a generation device according to one particular embodiment of the invention.

As illustrated in FIG. 4a, such a rendering device comprises a memory 2000 comprising a buffer memory, a processing unit 2001, equipped for example with a microprocessor μP and driven by the computer program 2002 implementing the method of synchronization according to the invention.

At initialization, the code instructions of the computer program 2002 are for example loaded into a RAM and then executed by the processor of the processing unit 2001. The processing unit 2001 inputs a multimedia stream. The microprocessor of the processing unit 2001 implements the steps of the method of synchronization described here above, according to the instructions of the computer program 2002, to synchronize the rendering of an element of the multimedia stream with the execution of the processing, on a distinct device, of pieces of additional data synchronized with the stream. To this end, the rendering device furthermore comprises: a module for receiving the multimedia stream, the multimedia stream comprising pieces of additional data synchronized with a multimedia element contained in the multimedia stream, a module for detecting, in the multimedia stream, at least one piece of destination information indicating that the pieces of additional data are intended for at least one execution device distinct from the rendering device, a module for extracting the multimedia element and pieces of additional data from the multimedia stream, a module for transmitting additional data to the execution device, the transmission triggering an execution, by a software application of the execution device, of an operation for processing the pieces of additional data transmitted and a module for rendering the multimedia element.

These modules are driven by the microprocessor of the processing unit 2001.

As illustrated in FIG. 4b, such an execution device comprises for its part a memory 2100 comprising a buffer memory, a processing unit 2101, equipped for example with a microprocessor μP, and driven by the computer program 2102 implementing the method of synchronization according to the invention.

At initialization, the code instructions of the computer program 2102 are for example loaded into a RAM and then executed by the processor of the processing unit 2101. The processing unit 2101 inputs the pieces of additional data. The microprocessor of the processing unit 2101 implements the steps of the method of execution described here above, according to the instructions of the computer program 2102. To this end, the device for executing the pieces of additional data furthermore comprises: a module for discovering at least one rendering device announced within the local area network, a module for receiving pieces of additional data coming from the rendering device and a module for the execution, by means of a software application of the execution device, of an operation for processing the pieces of additional data received.

These modules are driven by the microprocessor of the processing unit 2101.

As illustrated in FIG. 4c such a generation device comprises a memory 40 comprising a buffer memory, a processing unit 41, equipped for example with a microprocessor μP, and driven by the computer program 42 implementing the method of synchronization according to the invention.

At initialization, the code instructions of the computer program 42 are for example loaded into a RAM and then executed by the processor of the processing unit 41. The processing unit 41 inputs a multimedia stream. The microprocessor of the processing unit 41 implements the steps of the method of generation described here above, according to the instructions of the computer program 42, to generate a multimedia stream comprising pieces of synchronized, additional data. To this end, the device for generating a multimedia stream comprises: means of insertion, into the multimedia stream, of pieces of additional data and at least one piece of destination information indicating that the pieces of additional information are intended for at least one execution device distinct from the device for rendering the multimedia stream, the devices being present within a local area communications network, and means of transmission designed for the transmission, following the detection of the destination information, of the pieces of additional data to a recipient execution device.

These modules are driven by the microprocessor of the processing unit 41.

The invention claimed is:

1. A method of synchronization between a rendering of a multimedia stream by a rendering device and an execution of an operation by a software application by at least one execution device, said rendering and execution devices being present within a local area communications network, said method comprising the following acts, in said rendering device:
   receiving said multimedia stream, said multimedia stream comprising pieces of additional data synchronized with a multimedia element contained in said multimedia stream; and
   detecting, in said multimedia stream, at least one piece of destination information indicating that said pieces of additional data are intended for at least one execution device distinct from said rendering device, wherein said act of detecting triggers the following acts:
      extracting said multimedia element and said pieces of additional data from said multimedia stream,
      transmitting said pieces of additional data to said at least one execution device, said transmitting triggering an execution, by the software application of the execution device, of an operation for processing said pieces of additional data transmitted, and
      rendering said multimedia element synchronized with the additional data extracted from said multimedia stream, the rendering being synchronized with the operation of processing of said additional data by the execution device.

2. The method according to claim 1, wherein said multimedia stream is an HBBTV type stream, said destination information being included in a descriptor present in an AIT (Applications Information Table) signaling table of said HBBTV stream.

3. The method according to claim 1, wherein said pieces of additional data correspond to an interactive application to be executed on a said execution device, the operation for processing said pieces of additional data comprising a triggering of the execution of said interactive application.

4. The method according to claim 1, wherein said method furthermore comprises the following acts:
   detecting, in said multimedia stream, at least one data packet associated with said pieces of additional data and intended for said at least one execution device,
   extracting said data packet from said multimedia stream,
   transmitting said data packet associated with said pieces of additional data to said at least one execution device, said transmission triggering an execution, by said software application of said execution device, of an operation for processing said transmitted data packet.

5. The method according to claim 3 wherein said method furthermore comprises the following acts:
   detecting, in said multimedia stream, at least one data packet associated with said pieces of additional data and intended for said at least one execution device,
   extracting said data packet from said multimedia stream,
   transmitting said data packet associated with said pieces of additional data to said at least one execution device, said transmission triggering an execution, by said software application, of an operation for processing said transmitted data packet.

6. The method according to claim 4, wherein said data packets associated with said pieces of additional data correspond to an HBBTV "event stream", type of event.

7. The method according to claim 4, wherein the acts of extracting correspond to a demultiplexing of said pieces of additional data and/or of said data packet associated with said pieces of additional data.

8. The method according to claim 1, further comprising detecting, in said multimedia stream, at least one indicator indicating the end of execution, by said software application of said execution device, of said operation for processing said pieces of additional data previously transmitted to said execution device.

9. A method for generating a multimedia stream, the method comprising the following acts:
   inserting pieces of additional data into said multimedia stream, said multimedia stream comprising the pieces of additional data synchronized with a multimedia element contained in said multimedia stream; and
   inserting, into said multimedia stream, at least one piece of destination information indicating that said the pieces of additional data are intended for at least one execution device distinct from a device for rendering said multimedia stream, and
   transmitting said multimedia stream to at least one device for rendering said multimedia stream and configured to detect in the multimedia stream the destination information, which triggers the at least one device for rendering to extract said multimedia element and said pieces of additional data from said multimedia stream, transmit said pieces of additional data to a recipient execution device, and render said multimedia element, the rendering being synchronized with an operation of processing said additional data by the at least one execution device.

10. A non-transitory computer-readable storage medium storing a computer program comprising a set of instructions that can be executed by a computer or a processor of a rendering device, wherein the instructions configure the rendering device to perform acts of:
   synchronizing between a rendering of a multimedia stream by the rendering device and an execution of an operation by a software application by at least one execution device, said rendering and execution devices being present within a local area communications network, wherein synchronizing comprises, in said rendering device:
   receiving said multimedia stream, said multimedia stream comprising pieces of additional data synchronized with a multimedia element contained in said multimedia stream; and
   detecting, in said multimedia stream, at least one piece of destination information indicating that said pieces of additional data are intended for at least one execution device distinct from said rendering device, wherein said act of detecting triggers the following acts:
      extracting said multimedia element and said pieces of additional data from said multimedia stream,
      transmitting said pieces of additional data to said at least one execution device, said transmitting triggering an execution, by the software application of the execution device, of an operation for processing said pieces of additional data transmitted, and
      rendering said multimedia element synchronized with the additional data extracted from said multimedia stream, the rendering being synchronized with the operation of processing of said pieces of additional data.

11. A device for rendering a multimedia stream present within a local area communications network comprising:
a processing unit; and
a non-transitory computer-readable medium comprising instructions stored thereon, which are executable by the processing unit and include:
a module for receiving said multimedia stream by the processing unit, said multimedia stream comprising pieces of additional data synchronized with a multimedia element contained in said multimedia stream,
a module for detecting, in said multimedia stream, at least one piece of destination information indicating that said pieces of additional data are intended for at least one execution device distinct from said rendering device, wherein said detecting triggers the following modules:
a module for extracting said multimedia element and said pieces of additional data from said multimedia stream,
a module for transmitting said pieces of additional data to said at least one execution device, said transmission triggering an execution, by said software application of said execution device, of an operation for processing said pieces of additional data transmitted, and
a module for rendering said multimedia element synchronized with the additional data extracted from said multimedia stream, the rendering being synchronized with the operation of processing of said pieces of additional data.

12. A device for executing pieces of additional data present within a local area communications network comprising:
a processing unit; and
a non-transitory computer-readable medium comprising instructions stored thereon, which are executable by the processing unit and configure the device for executing to synchronize between a rendering of a multimedia stream by a rendering device and execution of an operation by a software application by the device for executing, said rendering device and device for executing being present within the local area communications network, wherein synchronizing comprises:
discovering the rendering device announced within said local area network; and
receiving the pieces of additional data coming from said rendering device, in response to said rendering device detecting, in said multimedia stream, the at least one piece of destination information indicating that said pieces of additional data are intended for the device for execution, and responsively extracting said multimedia element and said pieces of additional data from said multimedia stream; and
executing, by a software application of the device for executing, an operation for processing pieces of additional data received, wherein the operation for processing is synchronized with a rendering of the multimedia element by the rendering device.

13. A device for generating a multimedia stream comprising:
a processing unit; and
a non-transitory computer-readable medium comprising instructions stored thereon, which are executable by the processing unit and configure the processing unit to perform the following acts:
inserting pieces of additional data into said multimedia stream, said multimedia stream comprising the pieces of additional data synchronized with a multimedia element contained in said multimedia stream;
inserting, into said multimedia stream, at least one piece of destination information indicating that said pieces of additional data are intended for at least one execution device distinct from a device for rendering said multimedia stream, the devices being present within a local area communications network, and
transmitting said multimedia stream to at least one device for rendering said multimedia stream and configured to detect in the multimedia stream said destination information, which triggers the at least one device for rendering to extract said multimedia element and said pieces of additional data from said multimedia stream, transmit said pieces of additional data to a recipient execution device and render the multimedia element synchronized with the additional data extracted from said multimedia stream, the rendering being synchronized with an operation of processing said pieces of additional data by the recipient execution device.

14. The method according to claim 5, wherein said data packets associated with said pieces of additional data correspond to an HBBTV "event stream", type of event.

* * * * *